Jan. 27, 1948. W. E. STILWELL, JR 2,435,106
TRAFFIC DIRECTION INDICATOR
Filed Nov. 19, 1943 6 Sheets-Sheet 1

Fig. 1.

INVENTOR
William E. Stilwell, Jr.
BY
HIS ATTORNEY

INVENTOR
William E. Stilwell, Jr.
BY
HIS ATTORNEY

Jan. 27, 1948. W. E. STILWELL, JR 2,435,106
TRAFFIC DIRECTION INDICATOR
Filed Nov. 19, 1943 6 Sheets-Sheet 3

Fig. 3.

INVENTOR
William E. Stilwell, Jr.
BY
HIS ATTORNEY

Jan. 27, 1948.    W. E. STILWELL, JR    2,435,106
TRAFFIC DIRECTION INDICATOR
Filed Nov. 19, 1943    6 Sheets-Sheet 5

INVENTOR
William E. Stilwell, Jr.
BY
HIS ATTORNEY

Jan. 27, 1948.   W. E. STILWELL, JR   2,435,106
TRAFFIC DIRECTION INDICATOR
Filed Nov. 19, 1943   6 Sheets-Sheet 6

INVENTOR
William E. Stilwell, Jr.
BY
HIS ATTORNEY

Patented Jan. 27, 1948

2,435,106

UNITED STATES PATENT OFFICE 2,435,106

TRAFFIC DIRECTION INDICATOR

William E. Stilwell, Jr., Cincinnati, Ohio

Application November 19, 1943, Serial No. 510,997

18 Claims. (Cl. 73—189)

This invention relates to improved traffic direction indicators, and particularly, to directional apparatus for the control of take-off and landing operations involved in aircraft traffic at airports.

It is an object of the present invention to provide means whereby the pilot of aircraft about to land at an airport may be directed to a selected runway.

It is an object of the invention to provide remote control apparatus for otherwise free-swinging traffic direction indicators.

It is an object of the invention to provide means whereby the operator in the control tower of an airport may, by remote control, cause a traffic direction indicator to assume a desired angle with respect to the wind's direction during times when the velocity of the wind at the airport has died down or is below a predetermined safe transitional value, thus enabling the operator to use the traffic direction indicator as a means to direct airborne traffic to any of the runways of an airport, preferably at such times when the wind velocity permits of such traffic direction.

It is an object of the invention to provide means whereby the pilot of an aircraft may be directed by the airport traffic control operator to one of a plurality of runways during conditions of wind velocity which would not render it hazardous to land upon the selected runway even though the direction of the runway is cross-wind; or during a limited emergency period, wherein the traffic-control operator must evaluate the hazard of directing aircraft to land in a normally disadvantageous direction against a condition of local hazard existing on the airport or an emergency traffic condition.

It is an object of the invention to provide means whereby the traffic control operator of an airport, from his position in the traffic control station of the airport, may, by remote control, cause traffic direction-indicating apparatus disposed on the landing field to point out the direction in which the pilot of an airplane is to come to a landing at the airport.

It is an object of the invention to provide means at the remote control station which will visually indicate to the operator the position of the traffic direction indicator, so that the operator does not have to direct his attention away from his control board to ascertain the direction assumed by such indicator.

It is an object of the invention to provide airport traffic control means wherein the operator control of the traffic direction indicator is overcome or made nugatory by means of an electric switch or other cut-off controlled by an omnidirectional anemometer when the wind velocity conditions exceed a predetermined value, whereupon the traffic direction indicator swings under wind pressure to point in the direction of the wind.

It is an object of the invention to provide motor driven directional apparatus wherein the drive between the motor and the traffic directional apparatus embodies clutch means in which the extent of slip may be controlled, so that in the event of a break-down of the motor control cut-out apparatus, increased wind velocity will cause the directional apparatus to swing against any capacity of the motor and clutch to restrain such swing.

It is an object of the invention to provide means whereby the slip of the clutch may be automatically regulated according to the relative angle between the true wind direction and the direction of the controlled traffic direction indicator.

According to a preferred embodiment of the invention, the improved directional apparatus comprises a traffic direction indicator mounted for power driven rotation under certain conditions of wind velocity and for free swing when the wind velocity exceeds a predetermined rate.

An advantageous form for said traffic direction indicator is an elongated tetrahedron with its long axis parallel to the ground. Counterweight means balance the structure; means are provided for continuous or "blinker" illumination.

The controlled rotation or positioning of the traffic direction indicator is advantageously through an electric motor and suitable clutch apparatus, said motor being geared to the traffic direction indicator to rotate the same at a suitable rate, say 1 or 2 R. P. M. Means are provided to regulate the strength—i. e., "slip"—of the clutch, so that the wind may swing the indicator against any restraining influence of the clutch when the wind velocity has exceeded a predetermined rate.

The traffic direction indicator may be swung in either direction by a suitable reversing circuit of the motor; by supplemental self-synchronizing motor means, a traffic direction indicator located on the control board in the control tower apprises the operator of the position assumed by the indicator on the field, whether such position results from controlled or free-swinging operations.

A feature of the invention resides in wind pressure actuated means preferably of the omnidirectional anemo governor type for the cut-out of the motor control system, pursuant to which the motor control of the indicator is rendered inoperative for all wind velocities above the preestablished rate. Hence, while the operator may position the indicator according to his judgment under conditions of wind velocity which would render it safe for an aviator to land on a selected runway despite the direction of the wind, the operator may not, except under limited conditions of emergency, control the direction of the indicator when the wind velocity has exceeded such safe rate. However, under conditions of accelerated wind velocity, it is arranged that the wind indicator shall be acted upon by the wind alone, thereby swinging the indicator "into the wind" to apprise the pilot of a landing plane not only of the wind direction but of the most suitable runway to use for landing his aircraft.

It is obvious that in an airport, either commercial or military, wherein traffic conditions are heavy, a local situation may arise in which the traffic control operator must evaluate the hazard of landing a plane under adverse wind direction conditions against the hazard of having such plane land upon a runway which, according to accepted practice or field routine, is not ordinarily the proper runway. In such circumstance, my improved traffic control system includes an emergency switch which is adapted to shunt the wind-pressure actuated switch so as to retain the control of direction of the indicator for a limited period of time. However, the magnetic clutch of the drive mechanism may be so adjusted that a wind velocity which would make it extremely hazardous for the pilot of a plane to land in any direction other than into the wind will swing the indicator against the "slip" of the clutch, to head into the wind and thereby direct the landing pilot to the appropriate landing runway.

In essentials, therefore, my improved directional apparatus comprises a rotatable traffic direction indicator, the directions and extent of rotation of which are under the control of the operator for all wind velocities below a certain preestablished rate, with preferably automatic means for cutting out such control at higher wind velocities, except for emergency operation of limited duration; and in the latter circumstance, except for the effect of the wind upon the indicator in overcoming the power of the clutch to transmit the motor power to the indicator.

Further features and advantages will hereinafter appear.

Referring to the drawings.

Referring to the drawings for a more complete description of the invention, my improved traffic control system comprises a rotatably mounted normally wind-operated directional indicator, means other than wind pressure for controlling the directional position thereof, and apparatus responsive to wind velocity for connecting and disconnecting the indicator control means in accordance with predetermined conditions of wind velocity, as later described.

The traffic direction indicator is a covered frame tetrahedron 10, suitably located on the airport for maximum visibility from the air, mounted for rotation on a shaft 11 journalled within antifriction bearings, a base 12 serving as a housing for apparatus for rotating the shaft and therewith mounted tetrahedron.

Figures 6, 7:
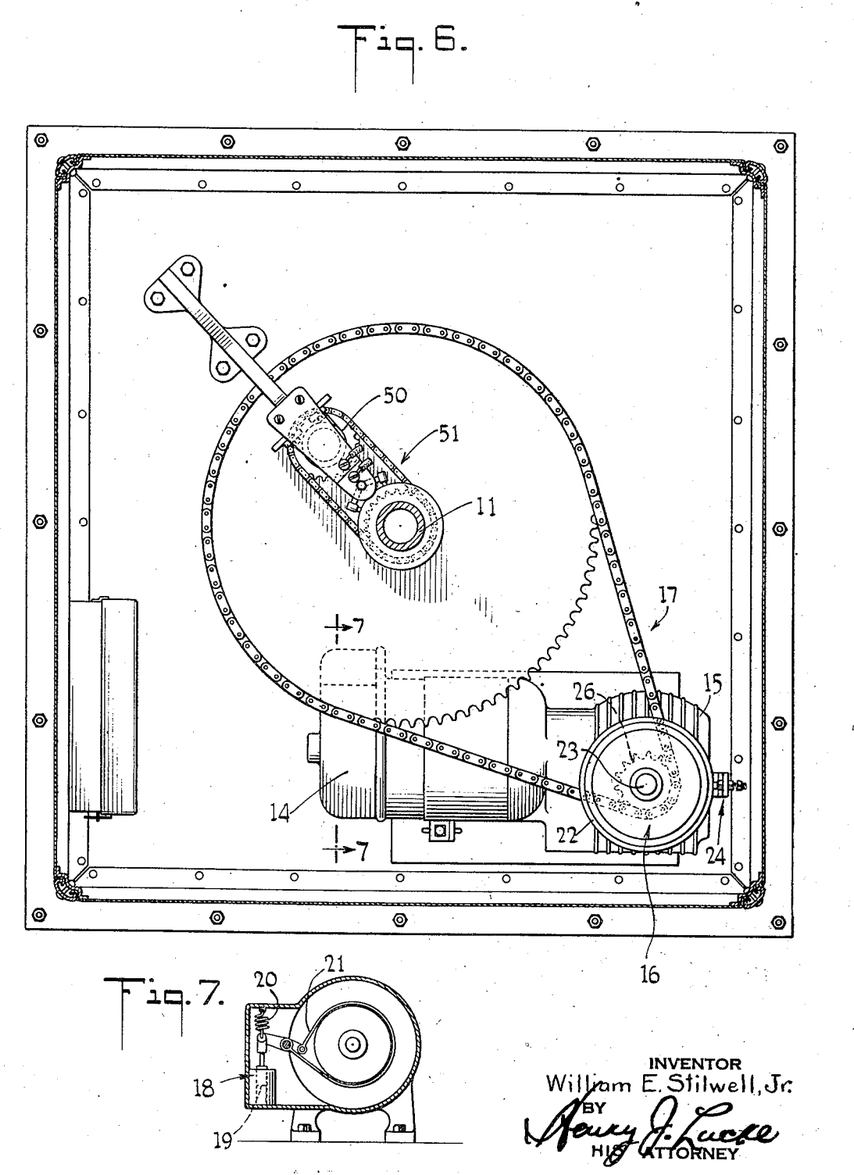
Fig. 6 is a plan view of the tetrahedron housing and apparatus taken on section lines 6—6 of Fig. 5.
Fig. 7 is a horizontal section of the tetrahedron drive motor, illustrating a form of braking means therefor.

The traffic direction indicator drive apparatus comprises an electric motor 14, with which is preferably associated an irreversible speed reduction mechanism 15 driving a slip controllable clutch 16, from which the illustrated chain and sprocket organization 17, Fig. 6, rotates the T at a desired rate, preferably 1 R. P. M.

A magnetic brake 18, Fig. 7, may be associated with motor 14; during the periods of operation of the motor, the solenoid 19 holds the brake off, against the pull of spring 20. When the motor power is cut off, the de-energizing of solenoid 19 permits spring 20 to tighten the brake band 21 about a brake drum mounted on the shaft of motor 14.

Figure 2:
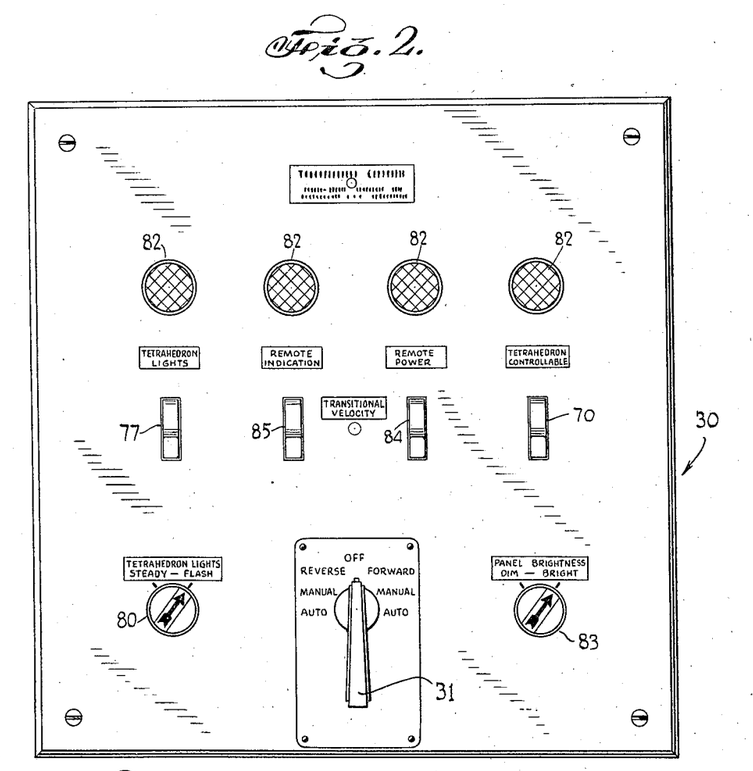
Fig. 2 is an elevation of the control panel.
Figure 3:
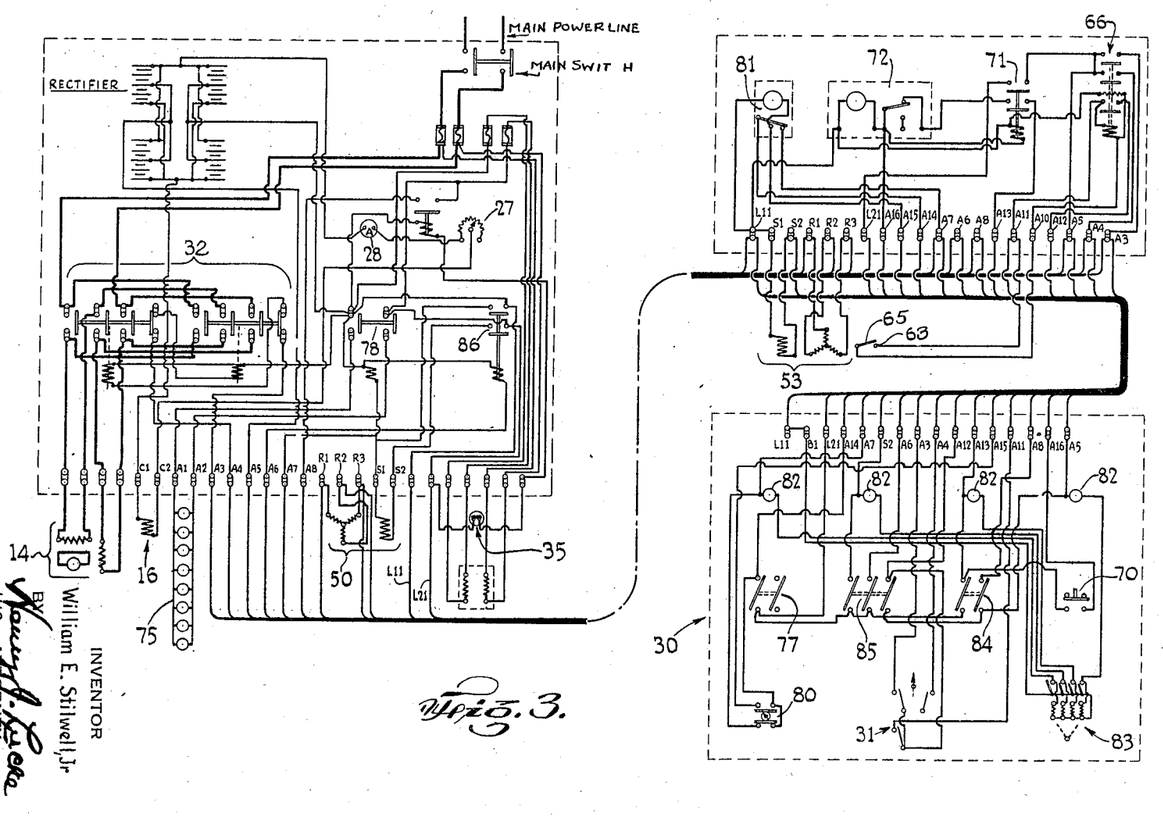
Fig. 3 is a wiring diagram for the apparatus.

The motor 14 is electrically reversible, and is controlled in its rotation by a circuit in which a standard drum-type multiple position switch 31 on the control panel 30, Fig. 3, acts through a motor-control contactor 32 to effect the desired direction of rotation of the motor. Switch 31, see Fig. 2 and wiring diagram, Fig. 3, has two positions in forward and reverse motor direction; the motor can be made to rotate so long as the handle of the switch is held on "manual," or the motor may be automatically stopped after the tetrahedron has assumed a new, desired, direction, by throwing the switch momentarily to "auto.," and then returning it to "off," as later set forth.

Figures 4, 5:
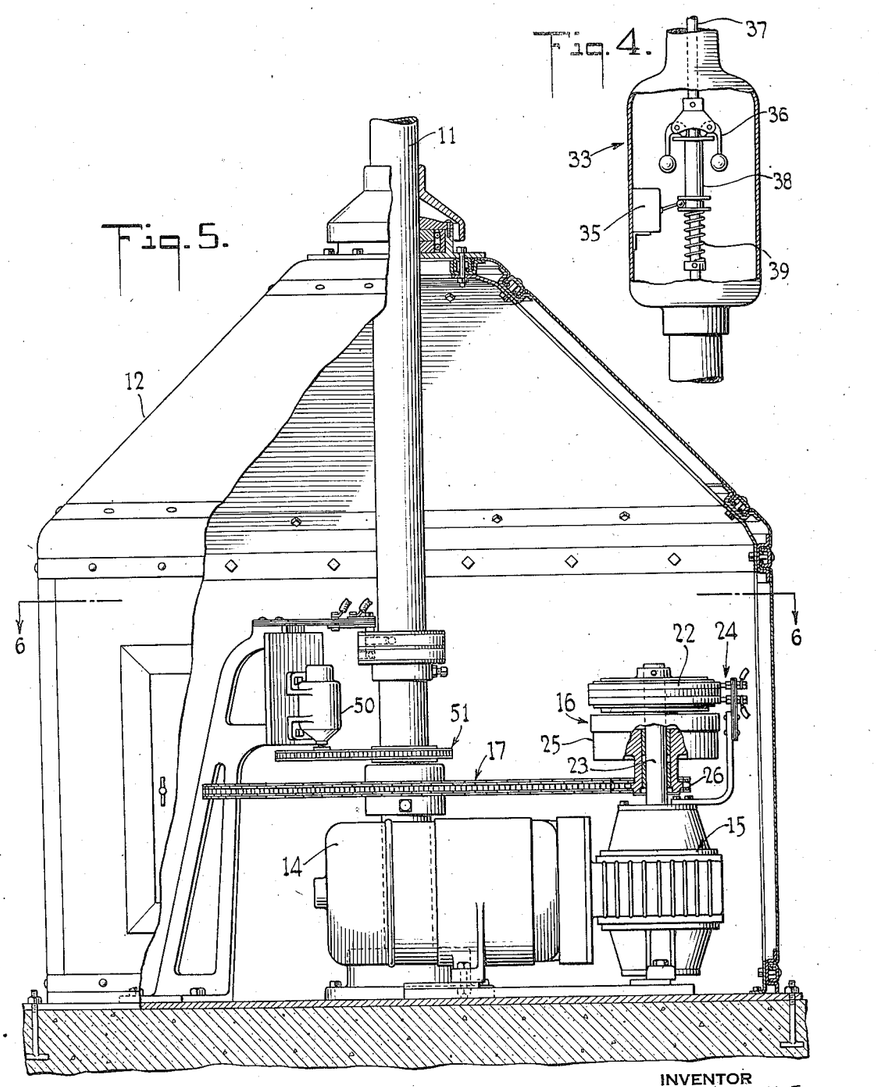
Fig. 4 is a vertical elevation, partly broken away in vertical cross-section of an anemogovernor, provided with a wind velocity operated cut-out switch.
Fig. 5 is an elevation of the tetrahedron base housing with a portion of the wall removed to disclose the arrangement of apparatus therein.

The slip-controllable clutch 16, see Figs. 5 and 6, may be of any suitable type, but is preferably magnetic; an electromagnetic rotor 22, mounted for rotation with driven shaft 23 of speed reducer 15 derives electric power through a slip ring and contact organization 24. Electromagnetic rotor 22 operates upon an armature 25 supported for rotation independently of shaft 23 and carrying a sprocket 26, which forms the drive sprocket of the organization 17. Hence, as shaft 23 is driven by motor 14, sprocket 26 rotates accordingly, within the capacity of the magnetic clutch 16 to transmit the rotation of the shaft to the sprocket.

The power transmission capacity of clutch 16 may be regulated by control of the magnetic strength of rotor 22; this may conveniently be effected by suitable adjustment of a rheostat 27 in the power circuit to clutch rotor 22, see Fig. 3. An ammeter 28, Fig. 3, affords indication of the clutch magnetism strength.

The control of rotation of the tetrahedron remains in the hands of the operator under all conditions of wind velocity wherein it would be safe to direct the pilot of a plane to land on any runway, regardless of the direction of the latter with respect to wind direction. Such maximum wind velocity, under present conditions, may be assumed as ten miles per hour. The velocity of ten miles per hour may be said to be the transitional velocity between unrestricted and restricted conditions of airport traffic operation.

Except for emergency operation of limited duration, later to be explained, the motor 14 and magnetic clutch 16 are disconnected from the control circuit at wind velocities of above 10 miles per hour by means of an omni-directional anemo governor, comprising an anemometer 34, see Fig. 1, equipped with a governor 33, provided with an adjustable wind velocity controlled switch 35. Said wind velocity controlled switch, see Fig. 4, may be operated by centrifugal means such as governor 36, which spins with the anemometer shaft 37, and exerts upon sleeve 38 a downward pressure which increases as wind velocities increase. Said sleeve is movable in opposition to a coil spring 39 and is operatively associated with the wind velocity controlled switch 35. An anemometer such as is indicated at 34 is omnidirectional in that the anemometer is at all times responsive to the force of the wind irrespective of its direction at any instant and irrespective of variation of direction and variation of velocity, whereby the anemometer and therewith its associated centrifugal governor 36 is at all times responsive to the average velocity of the wind for any given interval of time. Such advantages are attained to the optimum, by mounting the anemometer and its associated elements independently of the tetrahedron or other traffic direction indicating means. By suitable arrangement of the cut-out and cut-in positions of said switch 35, and taking advantage of the inherent inertia of the anemometer and centrifugal mechanism, the wind velocity controlled switch responds relatively slowly to changes in wind velocity, thereby preventing operation of the wind velocity controlled switch by short-lived gusts of wind having an average velocity during such short-lived gusts less than the predetermined velocity at which the switch 35 is cut-out, during which period the tetrahedron is maintained fixedly in its selected position of direction, unaffected by such temporary increased wind velocity. Preferably, the wind velocity controlled switch has a differential of one or two miles per hour between the cut-out velocity and cut-in velocity, to preclude fluttering of the wind velocity controlled switch.

Figure 1:
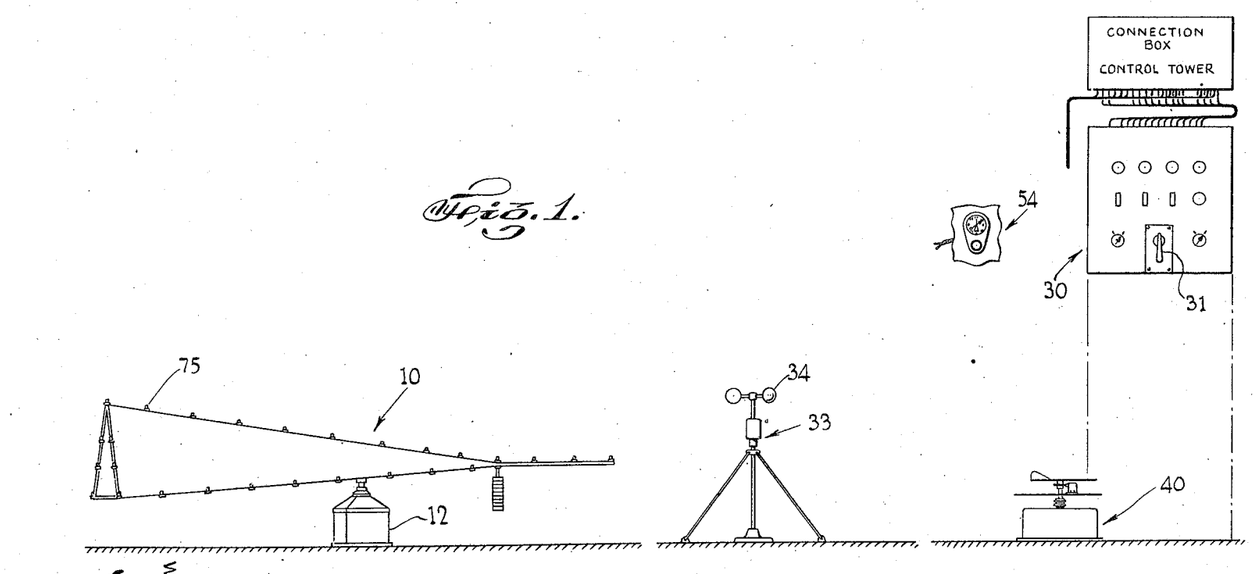
Fig. 1 is a schematic representation of the apparatus located on the airport and in the control tower.

A conventional omni-directional anemo governor including an anemometer, as indicated generally at 34 in Fig. 1 and in further detail in Fig. 4 includes a vertically extending shaft, arms respectively secured at one end to said shaft and extending radially therefrom, and cups respectively secured to the free ends of said arms in the same angular relation to one another.

When the wind velocity controlled switch 35 has opened the motor control circuit, the indicator 10 rotates freely on its bearings, because the magnetic clutch 16 is in the motor control circuit and hence is de-energized concomitantly with the breaking of the motor control circuit.

The traffic direction indicator 10 is of substantial size and area, and wind pressure exerts a continuous pressure thereon to urge it to swing "into the wind." The speed reducer is preferably worm drive; assuming the magnetic clutch to be of suitable strength, wind-induced movement of the wind indicator at all wind velocities below a certain rate will be precluded. The "slip" of clutch 16 may be so regulated by rheostat adjustment that wind velocities above a predetermined figure will rotate the traffic direction indicator against the restraining action of the clutch, thereby taking control of rotation away from the operator when the wind velocity makes it imperative that the aviator land in a direction having a definite relationship to the direction of the wind.

Figure 8:
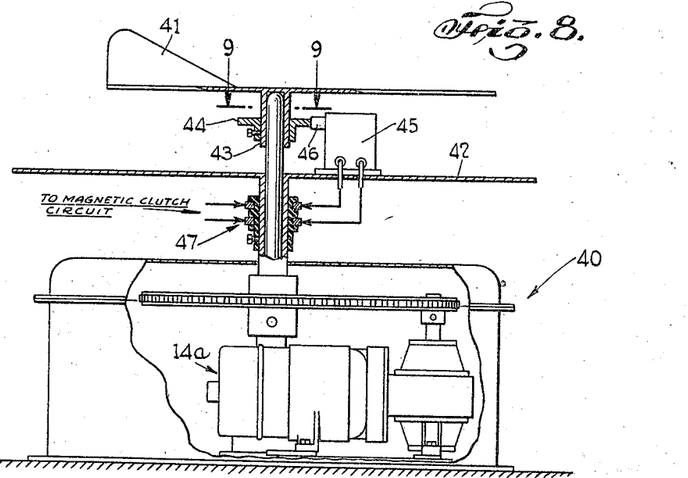
Fig. 8 is a representation, partly in section, of the wind-direction adjustment for the tetrahedron drive clutch.

The size and shape of the tetrahedron wind-indicator 10 is such that the traffic direction torque is a function of the relative angle of position of the tetrahedron with respect to wind direction. Wind tunnel tests have shown that the greatest wind torque is effective when the relative angle between the tetrahedron and wind direction is about 110°. It is apparent therefore that for a lesser or greater angle, assuming a preset and fixed amount of slip in the clutch, the wind velocity must be greater in order to slip the clutch and swing the tetrahedron into the wind. Under normal conditions of operation, the wind-velocity cut-out 33 de-energizes the magnetic clutch to permit the free swing of the tetrahedron; but for use as a safety factor the inherent slip of the magnetic clutch, it is desirable automatically to reset the magnetism of clutch 16 according to the relative position of the tetrahedron with respect to the actual wind direction. For such adjustment, I have devised apparatus 40 as shown in Fig. 8 in which a free swinging wind vane 41 is mounted for rotation on a shaft co-axial with the driven shaft of a turntable 42 which is driven by motor means 14a in the same motor circuit as the tetrahedron 10, whereupon indicator 10 and turnable 42 rotate concurrently, at the same speed, and assume the same directional position. Secured to shaft 43 of the wind vane is a cam 44, and upon turntable 42 is a rheostat 45 of which adjustment means is operatively associated with, a cam follower 46. By slip ring contacts 47, the rheostat adjustment is connected into the power circuit of magnetic clutch 16. Rheostat 45 and follower 46 move with turntable 42, whereas the cam moves with the free swinging wind vane 41; accordingly, by suitable configuration of the cam, the strength of magnetic clutch 16 may be adjusted according to the relative angle between the true wind direction, cutting down the clutch strength for angles in which the wind-torque upon the tetrahedron is lessened.

Figure 12:
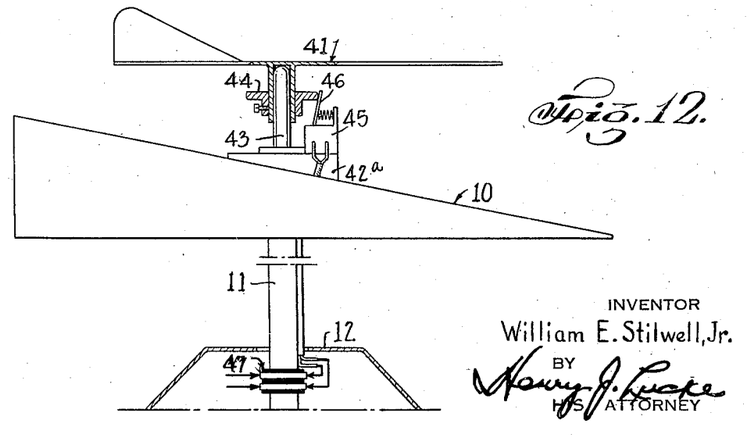
Fig. 12 is another embodiment of means for effecting free-swinging of the traffic direction indicator for a predetermined angular relationship of actual wind direction and indicator direction.

Alternatively, see Fig. 12, the wind vane 41 may be mounted upon the tetrahedron 10, a platform 42a carrying the rheostat 45, and connected into the clutch circuit by slip-ring contacts 47. If desired, the rheostat 45 may be supplanted by a switch in the motor and clutch circuit, to completely disconnect the clutch upon the attainment of the preestablished angular relationship.

The operator is informed of the directional status of the tetrahedron, whether controlled or freely-swinging, by a self-synchronized transmitter and receiver, respectively in the housing 12 and control room.

Figures 9, 10, 11:
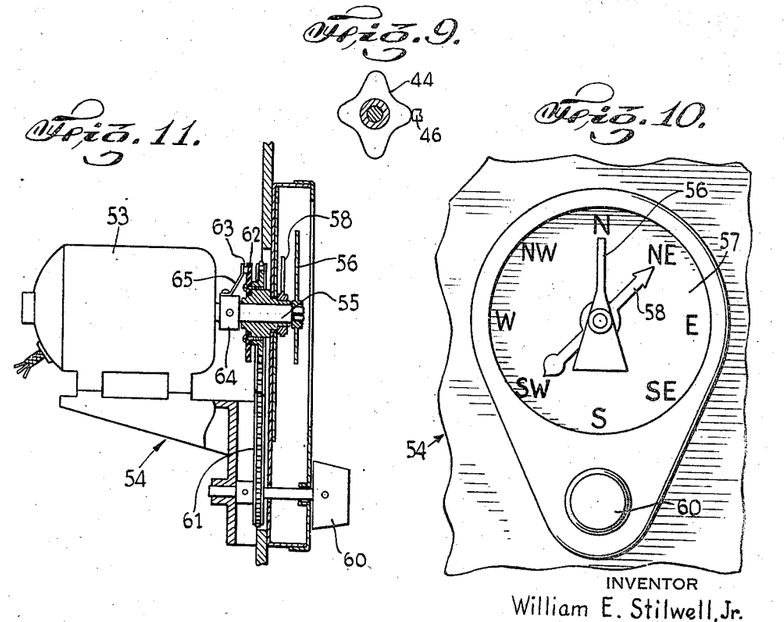
Fig. 9 is a section taken on lines 9—9 of Fig. 8 showing a typical wind-direction adjustment cam.
Fig. 10 is an elevation of the remote control tetrahedron positioner and position indicator.
Fig. 11 is a side elevation, partly in section, of the apparatus of Fig. 10 illustrating the self-synchronous receiver motor and automatic tetrahedron positioning apparatus associated therewith.

A self-synchronizing motor 50, see Figs. 5 and 6, is driven by the rotation of indicator shaft 11 on a 1-1 ratio, by means of sprocket 51. A self-synchronizing receiver 53, Fig. 11 is mounted on an indicator structure 54, and the shaft 55 of receiver 53 carries a tetrahedron position indicator 56 with which is associated a dial 57 marked preferably with the cardinal and inter-cardinal compass points. As the tetrahedron 10 rotates, the indicator rotates in synchronism therewith.

A feature of the invention is that the operator may cause the tetrahedron 10 to rotate under a manual control by setting the handle of switch 31 to "manual" in either forward or reverse direction. So long as the switch is in such position, the motor 14 will continue to operate, assuming that it has not been cut out of service by the wind-velocity cut-out switch 35.

If, however, the operator wishes to make a large change in the directional position of the tetrahedron 10, it is obvious that a time period of from 35 to 40 seconds through which the tetrahedron may have to rotate to assume its new position, is an unduly long time for the operator to direct his attention to the matter or re-setting the position, bearing in mind that control room operations in an airport are frequently matters calling for immediate attention to many operations. The invention provides, therefore, for automatically positioning the T according to the new set position required by the operator. This is accomplished by means of apparatus at indicator 54, including a direction pointer 58 adapted to be set at any desired position by the operator by means of the knob 60, rotation of which, through a chain and sprocket assembly 61, causes a rotation of the pointer 58. Fixed to the sprocket of the pointer, to rotate therewith, is an insulating structure 62 on which is mounted a contact 63 said contact being in alignment with the pointer 58. Carried on the shaft 55 of the receiver motor 53 to rotate therewith is an insulated sleeve 64 which carries a conductor arm 65 carrying the contact 63. The position marked "auto" on the control switch energizes a holding coil relay 66, see Fig. 3, which maintains power in the tetrahedron drive motor 14. The respective contacts 63 and 65 are connected into the holding coil circuit to shunt the holding coil out of circuit when the said contacts come into engagement.

For automatic positioning of the tetrahedron 10, the operator sets the pointer 58 at the desired directional position, and throws the control switch 31 momentarily into the "auto" position, whereupon he returns it to "off" position. The holding coil keeps the drive motor 14 energized, and as the tetrahedron 10 swings to its new position, the self-synchronizing transmitter motor 50 drives the receiver motor 53 in the direction in which the tetrahedron is turning. As the shaft 55 of the receiving motor 53 rotates, the movable contact 65 approaches and eventually comes into contact with the contact 63 at which instant the tetrahedron indicator 56 and the setting pointer 58 will be in precise alignment. When the contacts make, the holding coil 66 is shunted out of the motor drive circuit; and the main motor control switch 31 being in "off" position, the drive motor 14 of the tetrahedron stops. The tetrahedron is then positioned according to the new setting desired by the operator.

Under certain conditions of operation, it may be necessary that the operator render the wind velocity cut-out switch 35 ineffective to disconnect the electric motor 14 from its control circuit. A suitable time switch 70, see Figs. 2 and 3, of any conventional construction is provided, which for a limited period, for example, five minutes, will keep the motor circuit closed to afford motor control of the direction of the tetrahedron 10 independently of the actuation of the switch wind velocity cut-out 35. However, such emergency control may itself be negatived in the circumstance of relatively high wind velocities, in that said wind velocities may slip the clutch 16, to cause the tetrahedron 10 to swing into the wind regardless of direction of rotation of the motor 14.

The time switch 70 may be a single throw double pole switch on the panel board 30, actuating a relay 71 which controls the operation of the timer 72, see Fig. 3. The timer shunts the wind velocity cut-out switch 35 out of the motor control circuit, thereby keeping the power on the motor 14 for so long a time as is practicable. The period of time operation is adjustable, but good practice dictates that the maximum emergency period of the time delay cut-out should not be more than five minutes.

The tetrahedron 10 is electrically lighted, by incandescent or gaseous tube lights 75, see Figs. 1, 2 and 3, suitably mounted, and deriving current through the slip-ring contacts 76, indicated in Fig. 5, disposed on the tetrahedron shaft 11, a switch 77, see Fig. 2, on the panel 30 operating through relay 78 to light the lights. Advantageously, the lights may be continuously or intermittently illuminated; in the latter circumstance, a double throw, double pole switch 80 on the control board can be employed to interconnect a flasher device 81 into the light circuit.

As appears from the wiring diagram, the control circuit is accomplished through the use of appropriate contact relays, in turn operated by suitable switches on the main control panel 30. Pilot lights 82, appropriately wired in the control circuit visually indicate to the operator the status of operation of the respective control devices. For example, under all conditions wherein the tetrahedron 10 is under control, an appropriate light on the panel board is illuminated, such condition existing during the period for which the time delay switch is operated to retain control over the T in the emergency condition above set out. A switch 83 may be employed to control the brightness of the panel lights.

The remote power control unit cannot be operated unless both the remote power switch 84 and the remote indication 85, the latter operating through relay 86, see Fig. 3, are in the "on" position; thus the operator cannot rotate the tetrahedron without having, through the remote indication receiver 53, a visual indication of the tetrahedron position.

It will be understood that the apparatus has been described in an illustrative sense only, and that definitions and descriptive words used in the specification are not intended to limit the apparatus to the type and/or form shown. For example, the wind indicator 10 has been illustrated and referred to as a tetrahedron; obviously, it may be constructed and employed in other shapes. The respective contact relays which are actuated by the control panel switch means may be any appropriate form of standard remote-control relays, operated by high or low voltage actuators, according to the requirements of the installation.

In locations where the control or traffic tower is at a relatively great distance from the locations of the respective relays, substantial economies in wiring result from the employment of low-voltage relay actuations, as will be fully understood by those skilled in the art.

Whereas I have described my invention by reference to specific forms thereof, it will be understood that many changes and modifications may be made provided they do not depart from the scope of the claims.

I claim:

1. In combination, a direction indicator mounted for rotation, a motor for changing the directional position of said indicator, a variable slip clutch, manually operable means for regulating the extent of slip of said clutch; means operatively connecting said clutch between said motor and said indicator, means for remotely controlling the operation of said motor, and wind velocity operated means for disconnecting said remote control means from said motor to permit free rotation of said indicator.

2. In combination, an indicator mounted for rotation, remotely-controllable means for rotating said indicator, a variable slip magnetic clutch interposed between said indicator and said means for rotating the same, wind-velocity responsive means, and means controlled by said wind velocity responsive means for de-magnetizing said clutch under the condition of predetermined range of wind velocity.

3. In combination, a direction indicator mounted for rotation, mechanical means for changing the directional of said indicator, an electromagnetic clutch interposed between said indicator and said rotating means thereof, manually operable means for controlling the magnetic strength of said clutch, and means responsive to the force of the wind in the vicinity of said indicator for rendering said clutch non-operative with respect to said mechanical rotation means whereby to permit wind-induced rotation of said indicator.

4. In an airport, a direction indicator exposed to wind pressure, means for selectively continuously or intermittently illuminating said indicator, manually controlled mechanical drive means for moving said indicator against the direction of wind and for retaining said selected direction against the counter-effect of wind action, wind velocity controlled means for cutting out said mechanical drive means to permit said direction indicator to swing responsive to wind action under conditions of wind velocity within a predetermined range, manually controlled means for disconnecting said wind-velocity means to retain mechanical control over the movement of said indicator, presettable timing means controlling said manually controlled disconnecting means, clutch means between said indicator and said mechanical drive means, and manually controlled means for varying the slip of said clutch means whereby to permit said indicator to swing by wind pressure independently of the operative status of the wind velocity cut out means and of said manually controlled disconnecting means.

5. In an apparatus of the class described, an indicator mounted for rotation to a desired angular position, a drive motor for said indicator, self-synchronising motor means including a transmitter motor and a receiver motor arranged to rotate with the indicator in synchronism therewith, a pointer driven by the receiver motor to disclose the angular position of the indicator, a manually adjustable index pointer associated with said indicator disclosure pointer, manually operable means for starting and stopping said indicator drive motor, and means including a manually settable index pointer controlled by said indicator-responsive pointer upon coincidence of position of said latter-named pointer with said index pointer for rendering said drive motor starting and stopping means nonoperative.

6. In a direction indicator comprising a relatively large-area pointer mounted for power-driven or wind-induced rotation and drive means for rotating said indicator to a new angular position, said drive means including a clutch having a controllable amount of slip, means for regulating the amount of slip in said clutch in accordance with the angular relationship between the direction of the pointer with respect to the direction of the wind.

7. In an apparatus of the class described, an indicator mounted for power-driven or wind-induced rotation, said indicator having a substantial surface exposed to wind pressure, an electric motor for rotating said indicator into any desired angular direction, said motor driving said indicator through a magnetic clutch, means for regulating the magnetic strength of said clutch in accordance with the angular relationship between the direction of the wind and the direction of the pointer with respect thereto, whereby when the wind direction is at a predetermined angle with respect to the indicator, the clutch will have a greater amount of slip to permit wind-induced rotation of the indicator, in opposition to the operation of the motor contrary thereto.

8. In a remotely controllable direction indicating apparatus, an indicator mounted for rotation, said indicator being exposed to the wind, a motor for rotating said indicator to a desired angular position, a magnetic clutch in the transmission between motor and indicator, the power-transmission strength of the clutch being regulatable by adjustment of the magnetism thereof, a predetermined value of wind torque exerted against said indicator being effective to rotate said indicator in opposition to the driving effort of the motor, and means for automatically changing a pre-established magnetic strength of the clutch according to the relative angle of the indicator with respect to the direction of the wind.

9. In a remotely controllable direction indicating apparatus, an indicator mounted for rotation, said indicator being exposed to the wind, a motor for rotating said indicator to a desired angular position, an electromagnetic clutch in the transmission between the motor and the indicator, a rheostat in the magnetic clutch circuit to regulate the strength of the magnetic clutch, whereby a predetermined value of wind torque exerted against said indicator may be effective to rotate said indicator in opposition to the driving effort of said motor, and means for adjusting said clutch rheostat in accordance with the angular relationship of the indicator with respect to the direction of the wind.

10. In a remotely controllable direction indicating apparatus, an indicator mounted for rotation, said indicator being exposed to the wind, a motor for rotating said indicator to a desired angular position, an electromagnetic clutch in the transmission between the motor and the indicator, a rheostat in the magnetic clutch circuit to regulate the strength of the magnetic cluch, whereby a predetermined value of wind torque exerted against said indicator may be effective to rotate said indicator in opposition to the driving effect of said motor, a turntable mounting means for said rheostat, means for rotating said mounting means in synchronism with said indicator, a free swinging wind vane operatively associated with said turntable rheostat mounting, and means on said wind vane operating upon said rheostat to change the setting thereof according to the angle of said wind vane with respect to said turntable rheostat mounting means.

11. In a remotely controllable direction indicating apparatus, an indicator mounted for rotation, said indicator being exposed to the wind, a motor for rotating said indicator to a desired angular position, an electromagnetic clutch in the transmission between the motor and the indicator, a rheostat in the magnetic clutch circuit to regulate the strength of the magnetic clutch, whereby a predetermined value of wind torque exerted against said indicator may be effective to rotate said indicator in opposition to the driving effect of said motor, a turntable mounting means for said rheostat, means for rotating said mounting means in synchronism with said indicator, a free swinging wind vane coaxially mounted with respect to said turntable, a cam on said wind vane for rotation therewith and a cam follower associated with said rheostat whereby said cam effects adjustment of said rheostat upon rotation of said wind vane with respect to said turntable mounting.

12. In a direction indicating apparatus, an indicator mounted for rotation to any desired angular position, said indicator being exposed to the rotative effect of wind pressure, a motor for rotating said indicator to a desired angular position, a clutch in the transmission between motor and indicator, said clutch having a controllable amount of slip, means responsive to the angular position of the indicator relative to the direction of the wind to control the amount of slip in the clutch, and anemometer controlled means for disconnecting said indicator motor with respect to said indicator under condition of wind velocity exceeding a predetermined value.

13. In a direction indicating apparatus, an indicator mounted for rotation to a desired angular position, said indicator being exposed to the rotative effect of wind pressure, a motor for rotating said indicator to a desired angular position, a clutch in the transmission between motor and indicator, said clutch having a controllable amount of slip, a free-swinging wind vane mounted on said indicator, clutch control means controlled by said indicator and operatively associated with said clutch to regulate the amount of slip thereof, means associating said wind vane and said clutch control means for controlling the slip of the latter according to the angular position of the wind vane with respect to the indicator, and anemometer controlled means for disconnecting said indicator motor with respect to said indicator under condition of wind velocity exceeding a predetermined value.

14. In direction indicating apparatus, an indicator mounted for angular rotation, said indicator being exposed to the rotative effect of wind pressure, a motor for rotating said indicator, means for disconnecting the motor from the indicator to permit the indicator to swing free under wind pressures, a free-swinging wind vane to assume an angular position according to wind direction, and means associated with said wind vane to disconnect the motor from the indicator upon attainment of a preestablished angular relationship between the angular direction of the indicator and the direction of the wind, whereby the indicator may be rotated by wind pressure.

15. In direction indicating apparatus, an indicator mounted for angular rotation, said indicator being exposed to the rotative effect of wind pressure a motor for rotating said indicator, an electromagnetic clutch in the transmission between the motor and the indicator, a free-swinging wind vane to assume an angular position according to wind direction, and means associated with said wind vane to de-energize the electromagnetic clutch to permit wind-induced rotation of the indicator upon the attainment of a preestablished angular relationship between the position of the wind vane and the position of the indicator.

16. In combination, a direction indicator mounted for rotation; motor means for changing the directional position of said indicator; variable slip clutch means interposed between said motor means and said direction indicator; manually settable means for varying the slip of said clutch means; means for remotely controlling the operation of said direction indicator motor means; and anemometer controlled means for disconnecting said indicator motor means with respect to said direction indicator under condition of predetermined range of wind velocity.

17. In combination, a direction indicator mounted for rotation; motor means for changing the directional position of said indicator; variable slip clutch means interposed between said motor means and said direction indicator; manually settable means for varying the slip of said clutch means; means controlled by said direction indicator for varying the slip of said clutch means; means for remotely controlling the operation of said direction indicator motor means; and anemometer controlled means for disconnecting said indicator motor means with respect to said direction indicator under condition of predetermined range of wind velocity.

18. In combination, a directional indicator mounted for rotation; motor means for changing the directional position of said direction indicator; cut-off means for controlling the operation of said direction indicator motor means; omni-directional anemo governor means comprising an anemometer including a vertically extending shaft; stationary means for rotatably mounting said vertically extending shaft of said anemometer; and means actuated by the shaft of said anemometer for opening and closing said cut-off means under respective conditions of predetermined range of wind velocity, thereby connecting and disconnecting said motor means to and from said direction indicator.

WILLIAM E. STILWELL, Jr.

REFERENCES CITED

The following references are of record in the file of this patent:

UNITED STATES PATENTS

| Number | Name | Date |
|---|---|---|
| 2,244,148 | Graham | June 3, 1941 |
| 2,055,370 | Wilhelm | Sept. 22, 1936 |
| 501,246 | Eustis | July 11, 1893 |
| 2,277,625 | Baynes | Mar. 24, 1942 |